United States Patent
Sugiyama

(10) Patent No.: US 8,272,747 B2
(45) Date of Patent: Sep. 25, 2012

(54) DISTORTION DETECTION SYSTEM AND DISTORTION DETECTION METHOD

(75) Inventor: Yukinobu Sugiyama, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 700 days.

(21) Appl. No.: 11/630,328

(22) PCT Filed: Jun. 16, 2005

(86) PCT No.: PCT/JP2005/011056
§ 371 (c)(1),
(2), (4) Date: Nov. 8, 2007

(87) PCT Pub. No.: WO2006/001217
PCT Pub. Date: Jan. 5, 2006

(65) Prior Publication Data
US 2008/0297733 A1    Dec. 4, 2008

(30) Foreign Application Priority Data

Jun. 24, 2004   (JP) ............................ P2004-186940

(51) Int. Cl.
  *G03B 21/14*  (2006.01)
  *H04N 3/23*  (2006.01)
(52) U.S. Cl. ......................................... 353/70; 348/746
(58) Field of Classification Search .............. 353/69, 353/70, 121; 348/135, 136, 283, 321, 745, 348/746
See application file for complete search history.

(56) References Cited

U.S. PATENT DOCUMENTS

| 4,593,308 | A | 6/1986 | Kemplin |
| 6,292,171 | B1 | 9/2001 | Fu et al. |
| 6,499,847 | B1 * | 12/2002 | Yoneno ............................ 353/70 |
| 2001/0048478 | A1 | 12/2001 | Taoka |
| 2004/0195490 | A1 * | 10/2004 | Sugiyama et al. ......... 250/208.1 |

FOREIGN PATENT DOCUMENTS

| EP | 0 460 947 | 12/1991 |
| EP | 0 498 659 | 8/1992 |
| EP | 0 616 473 | 9/1994 |
| EP | 1 041 532 | 10/2000 |
| EP | 1 460 839 | 9/2004 |
| JP | 07-067125 | 3/1995 |
| JP | 07-131802 | 5/1995 |
| JP | 2003-189181 | 7/2003 |

(Continued)

*Primary Examiner* — William C Dowling
*Assistant Examiner* — Ryan Howard
(74) *Attorney, Agent, or Firm* — Drinker Biddle & Reath LLP

(57) ABSTRACT

The present invention relates to a distortion detecting system and a distortion detecting method having a structure for efficiently detecting distortion of a projected image that is projected onto a projected surface by a projector. The distortion detecting system includes a photodetecting apparatus, and an analyzing apparatus. When a reference brightness image is projected onto the projected surface by the projector, the photodetecting apparatus forms the projected image on the projected surface onto the photosensitive surface of the photodetector, and outputs light intensity profile data that indicates a one-dimensional distribution of incident light intensity in each of a first direction and a second direction on an image for inspection formed on the photosensitive surface. The analyzing apparatus detects distortion of the projected image by analyzing the light intensity profile data in the respective first direction and second direction outputted from the photodetecting apparatus based on known information concerning the reference brightness image.

2 Claims, 9 Drawing Sheets

FOREIGN PATENT DOCUMENTS

| | | |
|---|---|---|
| JP | 2004-088169 | 3/2004 |
| TW | 388172 | 4/2000 |
| TW | 556440 | 10/2003 |
| WO | WO 03/049190 | 6/2003 |
| WO | WO 03049190 A1 * | 6/2003 |

* cited by examiner (a)

(b)

(a)

(b)

(a)

(b)

DISTORTION DETECTION SYSTEM AND DISTORTION DETECTION METHOD

TECHNICAL FIELD

The present invention relates to a distortion detecting system and a distortion detecting method of detecting distortion of a projected image projected onto a projected surface by a projector.

BACKGROUND ART

As a projector, for example, there are known an over-head projector which projects an image of light transmitting through a transparent sheet on which images such as characters and figures are drawn onto a projected surface and a projector which projects an image outputted as a video signal from a computer or video equipment onto a projected surface. The projector has a structure which is arranged apart from a projected surface (screen or the like) and forms an arbitrary image on the projected surface by a projecting optical system, and is also capable of enlarging the arbitrary image and displays it on the projected surface. On the other hand, the projector and the projected surface are separate from each other, so that depending on their relative arrangement relationship, the projected image on the projected surface may be distorted.

As a technique for detecting such distortion of a projected image on a projected surface, for example, the detecting technique disclosed in Patent document 1 is known. In this detecting technique disclosed in Patent document 1, first, a reference brightness image having a light region in a dark region is projected onto a projected surface by a projector. Distortion of the projected image projected onto the projected surface is detected by a photodetecting apparatus that includes a two-dimensional PSD (Position Sensitive Detector) and an imaging optical system. Namely, the photodetecting apparatus forms a projected image on a photosensitive surface of the two-dimensional PSD by the imaging optical system, and detects distortion of the projected image by analyzing an output value from the two-dimensional PSD. A method in which a CCD is used instead of the two-dimensional PSD and distortion of a projected image is detected by performing image operations is also known.

Patent document 1: Japanese Patent Application Laid-Open No. 2004-88169

DISCLOSURE OF THE INVENTION

Problems that the Invention is to Solve

The present inventors have examined the above prior art, and as a result, have discovered the following problems. That is, the two-dimensional PSD to be applied to the photodetecting apparatus only detects a gravity center position of intensity of light made incident on the photosensitive surface, so that when a reference brightness image having one light region is projected onto a projected surface by a projector, the position of the light region of the projected image is detected by the photodetecting apparatus to which the two-dimensional PSD is applied. Therefore, in the above prior art, a plurality of reference brightness images each having one light region at different positions are prepared, and concerning the respective reference brightness images, the reference brightness images are projected and positions of the light regions of the projected images are detected, and then by comparing the obtained detected results, distortions of the projected images are detected. Therefore, the above prior art requires a long time to detect the distortion of the projected image projected onto the projected surface by the projector, and this detection is inefficient.

In addition, the positional operation of the two-dimensional PSD needs a logarithmic converter circuit or the like, so that the peripheral circuit becomes large in size and causes an increase in manufacturing cost. On the other hand, in the case where the CCD is applied instead of the two-dimensional PSD, data amount is large and image operations must be performed, so that the measuring device needs an image memory and an image computing unit, etc., and this may cause an increase in size of the photodetecting apparatus and an increase in manufacturing cost.

The present invention has been developed to eliminate the problems described above. It is an object of the present invention to provide a distortion detecting system and a distortion detecting method having a structure for efficiently detecting distortion of a projected image projected onto a projected surface by a projector.

Means for Solving the Problems

A distortion detecting system according to the present invention has a structure for detecting distortion of a projected image projected onto a projected surface by a projector. The distortion detecting system comprises a photodetecting apparatus and an analyzing apparatus. The photodetecting apparatus includes a photodetector which has a plurality of pixels two-dimensionally arranged on a photosensitive surface, and an imaging optical system which forms a projected image on the photosensitive surface. The photodetecting apparatus makes the imaging optical system form a projected image of a reference brightness image, that is projected onto a projected surface by a projector, onto the photosensitive surface as an image for inspection, and outputs light intensity profile data of the image for inspection that indicates one-dimensional distributions of incident light intensity in a first direction and a second direction, respectively. The analyzing apparatus detects distortion of the projected image projected onto the projected surface by analyzing the light intensity profile data in the respective first and second directions outputted from the photodetecting apparatus based on known information concerning the reference brightness image.

On the other hand, the distortion detecting method according to the present invention is a method of detecting distortion of a projected image projected onto a projected surface by a projector. The distortion detecting method comprises a projecting step, a photodetecting step, and an analyzing step. In the projecting step, a reference brightness image is projected onto a projected surface by a projector. In the photodetecting step, a photodetecting apparatus comprising a photodetector which has a plurality of pixels two-dimensionally arranged on a photosensitive surface, and an imaging optical system which forms a projected image on the photosensitive surface is used. The photodetecting apparatus makes the imaging optical system form the projected image, that is projected onto the projected surface in the projecting step, onto the photosensitive surface as an image for inspection, and outputs light intensity profile data of the image for inspection in the respective first and second directions (acquisition of light intensity profile data). In the analyzing step, by analyzing the light intensity profile data in the respective first and second directions based on known information concerning the reference brightness image, distortion of the projected image projected onto the projected surface is detected.

As described above, to detect distortion of a projected image by using the distortion detecting system (distortion detecting method) according to the present invention, first, a reference brightness image is projected onto the projected surface by a projector (projecting step). Then, in the photodetecting apparatus, the projected image projected onto the projected surface by the projector is formed as an image for inspection on the photosensitive surface of the photodetector by the imaging optical system, and light intensity profile data of this image for inspection is acquired in each of the first and second directions (photodetecting step). Furthermore, by the analyzing apparatus, by analyzing the light intensity profile data in the respective first and second directions acquired by the photodetecting apparatus based on known information concerning the reference brightness image, distortion of the projected image projected onto the projected surface is detected (analyzing step).

In the distortion detecting system according to the present invention, it is preferable that the reference brightness image has a plurality of light regions in a dark region. In this case, the analyzing apparatus detects distortion of the projected image projected onto the projected surface by comparing position data that indicates arrangement of the light regions in the reference brightness image with position data of light intensity peaks generated in the light intensity profile data. On the other hand, in the distortion detecting method according to the present invention, it is also preferable that the reference brightness image has a plurality of light regions in a dark region. In this case, in the analyzing step, by comparing data that indicates arrangement of the light regions in the reference brightness image with position data of light intensity peaks generated in the light intensity profile data, distortion of the projected image projected onto the projected surface is detected.

Furthermore, in the distortion detecting system according to the present invention, the reference brightness image may have a plurality of light regions aligned on a straight line in a dark region. In this case, by comparing interval data of light regions in the reference brightness image and interval data of light intensity peaks in the light intensity profile data, distortion of the projected image projected onto the projected surface is detected. On the other hand, in the distortion detecting method according to the present invention, it is also allowed to use a reference brightness image having a plurality of light regions aligned on a straight line in a dark region. In this case, in the analyzing step, by comparing interval data of the light regions in the reference brightness image and interval data of light intensity peaks in the light intensity profile data, distortion of the projected image projected onto the projected surface is detected.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

Effects of the Invention

In accordance with to the present invention, distortion of a projected image projected onto a projected surface by a projector can be efficiently detected.

DESCRIPTION OF THE REFERENCE NUMERALS

Figure 1:
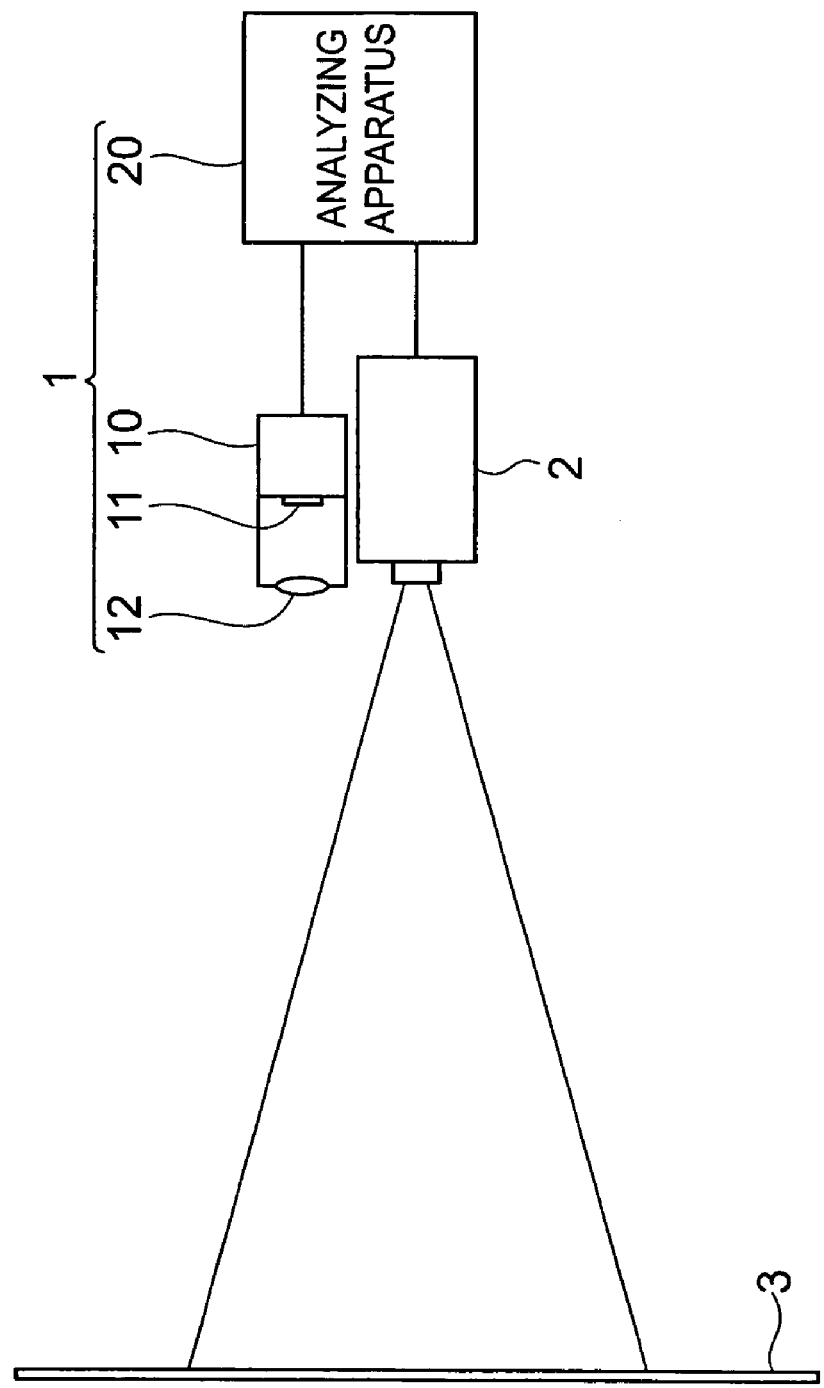
FIG. 1 is a drawing showing a configuration of an embodiment of a distortion detecting system according to the present invention.

1 . . . distortion detecting system; 2 . . . projector; 3 . . . projected surface; 10 . . . photodetecting apparatus; 11 . . . photodetector; 12 . . . imaging optical system; 20 . . . analyzing apparatus; 100 . . . photodetection part; 110 . . . first signal processing section; 111 . . . shift register; 112 . . . integrating circuit; 120 . . . second signal processing section; A . . . reference brightness image; and B . . . projected image.

BEST MODES FOR CARRYING OUT THE INVENTION

In the following, embodiments of a distortion detecting system and a distortion detecting method according to the present invention will be explained with reference to FIGS. 1 to 9. In the description of the drawings, identical or corresponding components are designated by the same reference numerals, and overlapping description is omitted.

FIG. 1 is a drawing showing a configuration of an embodiment of a distortion detecting system according to the present invention. In FIG. 1, a projector 2 and a projected surface 3 are shown in addition to the distortion detecting system 1. The projector 2 is arranged apart from the projected surface 3 and forms an arbitrary image on the projected surface by using a projecting optical system, and is also capable of enlarging and displaying this image on the projected surface 3. The distortion detecting system 1 is a system to detect distortion of a projected image projected onto the projected surface 3 by the projector 2. The distortion detecting system 1 includes a photodetecting apparatus 10 and an analyzing apparatus 20.

The photodetecting apparatus 10 comprises a photodetector 11 and an imaging optical system 12. The imaging optical system 12 forms a projected image on the projected surface 3 onto the photosensitive surface of the photodetector 11. The optical axis of the imaging optical system 12 of the photodetecting apparatus 10 is parallel to the optical axis of a projecting optical system of the projector 2, and it is preferable that the distance between these optical axes is short. The photodetector 11 has a plurality of pixels two-dimensionally arranged on the photosensitive surface. The photodetecting apparatus 10 outputs light intensity profile data that indicates one-dimensional distributions of incident light intensity in the respective first direction and the second direction on the photosensitive surface of the photodetector 11. The analyzing apparatus 20 inputs the light intensity profile data in the respective first direction and second direction outputted from the photodetecting apparatus 10 and analyzes these light intensity profile data.

To detect distortion of the projected image, first, a reference brightness image is projected onto the projected surface 3 by the projector 2 (projecting step). Then, in the photodetecting apparatus 10, the projected image on the projected surface 3 is formed as an image for inspection on the photosensitive surface of the photodetector 11 by the imaging optical system 12, and light intensity profile data of the image for inspection is acquired in each of the first and second directions (photodetecting step). Furthermore, in the analyzing apparatus 20, by analyzing the light intensity profile data in the respective first and second directions acquired by the photodetecting apparatus 10 based on known information concerning the reference brightness image, distortion of the projected image projected onto the projected surface 3 is detected (analyzing step).

The analyzing apparatus may transmit the reference brightness image data to the projector 2 and instruct the projector 2 to project the reference brightness image. Alternatively, the analyzing apparatus 20 may acquire the reference brightness image data to be projected by the projector 2 from the projector 2 or other devices.

Figure 2:
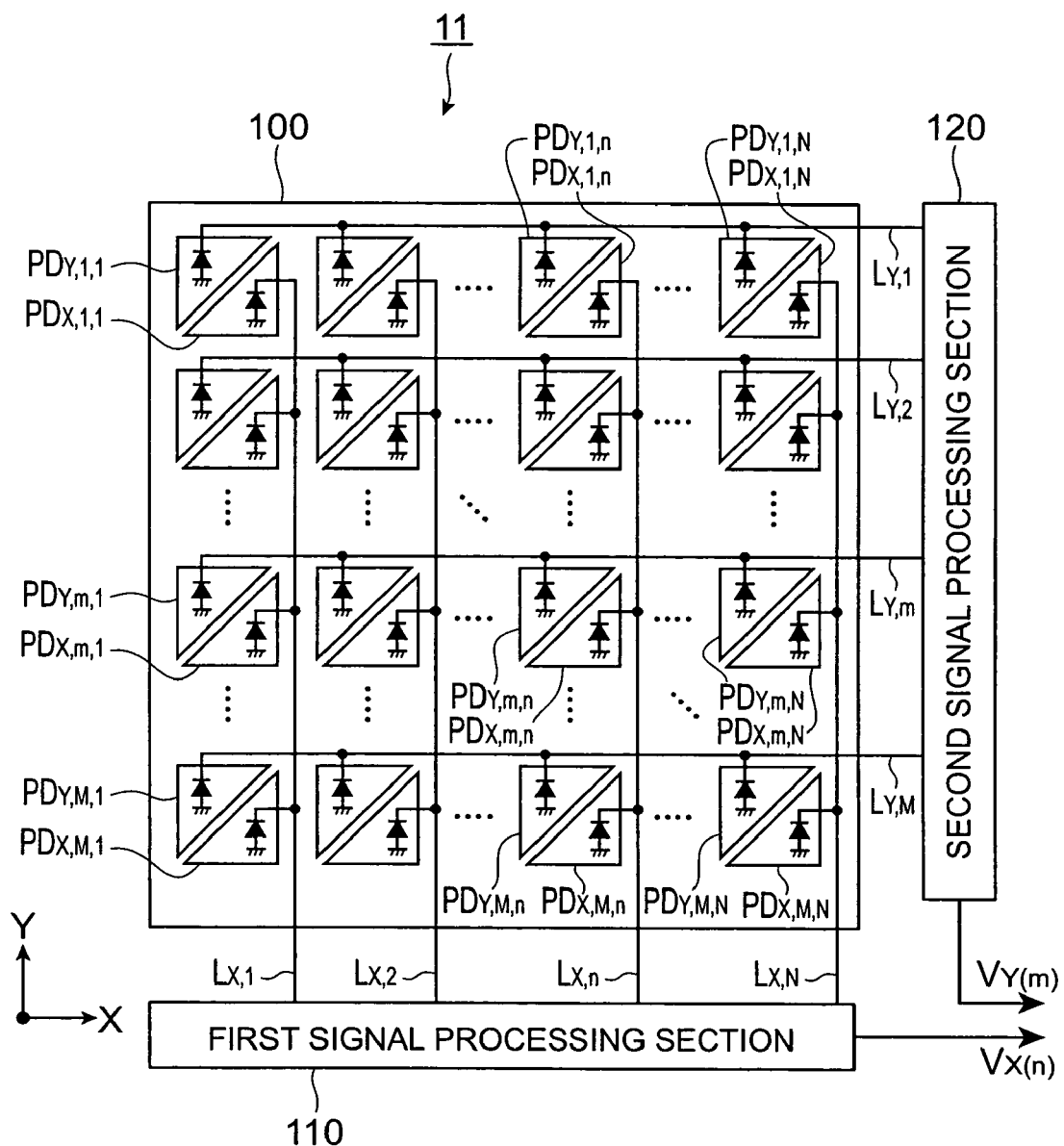
FIG. 2 is a plan view showing a configuration of a photodetector included in a photodetecting apparatus shown in FIG. 1.

FIG. 2 is a plan view showing a configuration of the photodetector 11 included in the photodetecting apparatus 10. The photodetector 11 includes a photodetection part 100, a first signal processing section 110, and a second signal processing section 120. The photodetection part 100 has M×N pixels two-dimensionally arranged on a photosensitive surface, and on a pixel at a position on the m-th row and n-th column, two photodiodes $PD_{X,m,n}$ and $PD_{Y,m,n}$ are formed. Herein, M and N are integers of 2 or more, and m is an arbitrary integer of 1 or more but M or less, and n is an arbitrary integer of 1 or more but N or less. Anode terminals of the two photodiodes $PD_{X,m,n}$ and $PD_{Y,m,n}$ are grounded. Cathode terminals of M photodiodes $PD_{X,1,n}$ through $PD_{X,M,n}$ of the n-th column are connected to the first signal processing section 110 by a common wiring $L_{X,n}$. Cathode terminals of N photodiodes $PD_{Y,m,1}$ through $PD_{Y,m,N}$ of the m-th row are connected to the second signal processing section 120 by a common wiring $L_{Y,m}$.

Figure 3:
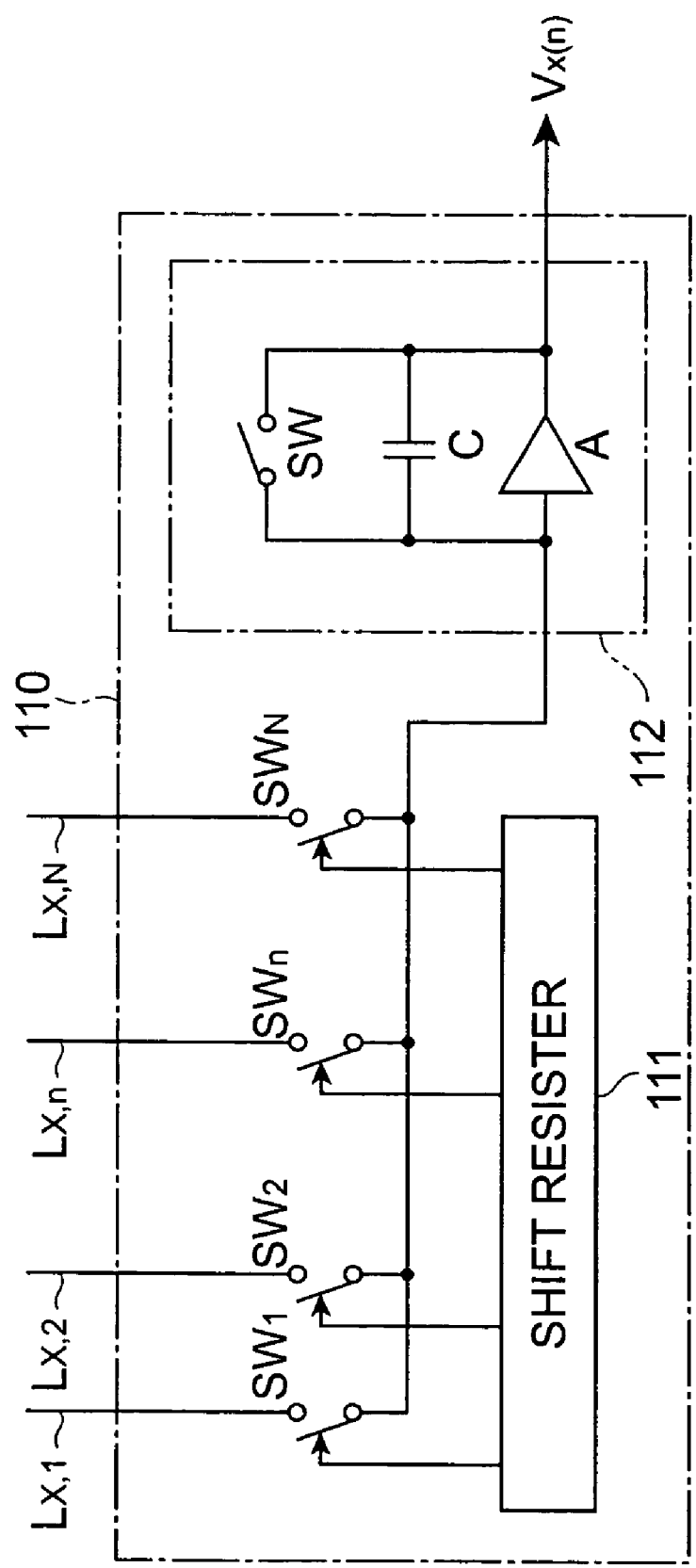
FIG. 3 is a circuit diagram of a first signal processing section included in the photodetector.

FIG. 3 is a circuit diagram of the first signal processing section 110 included in the photodetector 11. The first signal processing section 110 includes a shift register 111, an integrating circuit 112, and N switches $SW_1$ through $SW_N$. One ends of the switches $SW_n$ are connected to the wiring $L_{X,n}$, and the other ends of the switches $SW_n$ are connected to an input terminal of the integrating circuit 112 via a common wiring. The switches $SW_n$ close in order based on a control signal outputted from the shift register 111. The integrating circuit 112 includes an amplifier A, a capacitor C, and a switch SW. The capacitor C and the switch SW are connected parallel to each other, and are provided between an input terminal and an output terminal of the amplifier A. When the switch SW closes, the capacitor C starts discharging and a voltage outputted from the integrating circuit 112 is initialized. When the switches $SW_n$ close while the switch SW is open, the sum of electrical charges generated according to light incidence on the respective M photodiodes $PD_{X,1,n}$ through $PD_{X,M,n}$ of the n-th column connected to the wiring $L_{X,n}$ is inputted into the integrating circuit 112. The charges are accumulated in the capacitor C, and a voltage $V_X(n)$ corresponding to this accumulated charge amount is outputted from the integrating circuit 112. The second signal processing section 120 also has the same configuration as that of the first signal processing section 110 and operates in the same manner.

The photodetector 11 structured as shown in FIG. 2 and FIG. 3 can output first light intensity profile data $V_X(n)$ that indicates a one-dimensional distribution of incident light intensity in the first direction (X-direction in FIG. 2) on the photosensitive surface of the photodetection part 100 from the first signal processing section 110, and can output second light intensity profile data $V_Y(m)$ that indicates a one-dimensional distribution of incident light intensity in the second direction (Y-direction in FIG. 2) on the photosensitive surface of the light detecting part 100 from the second signal processing section 120. The analyzing apparatus 20 analyzes these first light intensity profile data $V_X(n)$ and second light intensity profile data $V_Y(m)$.

Next, operations of the distortion detecting system 1 according to the present invention will be explained by taking some detailed samples of the reference brightness image, and a distortion detecting method according to the present invention will be explained.

Figure 4:
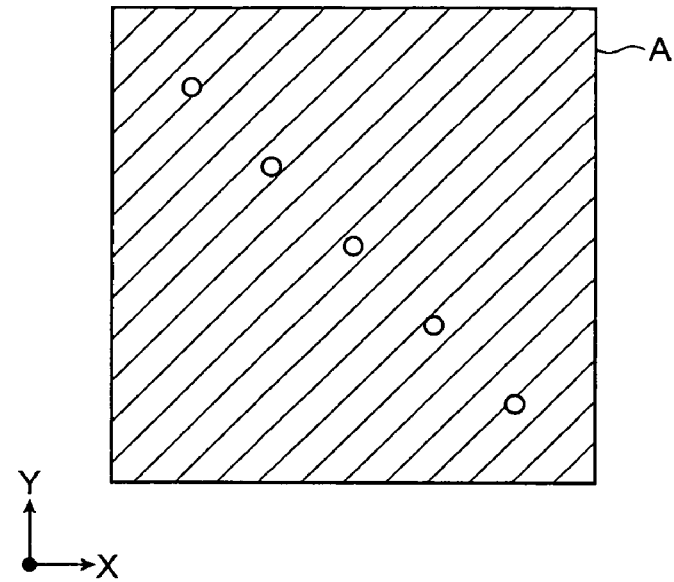
FIG. 4 is a drawing for explaining a distortion detecting method according to the present invention, showing a first sample of a reference brightness image and a projected image on a projected surface corresponding to the reference brightness image of the first sample.
Figure 4:
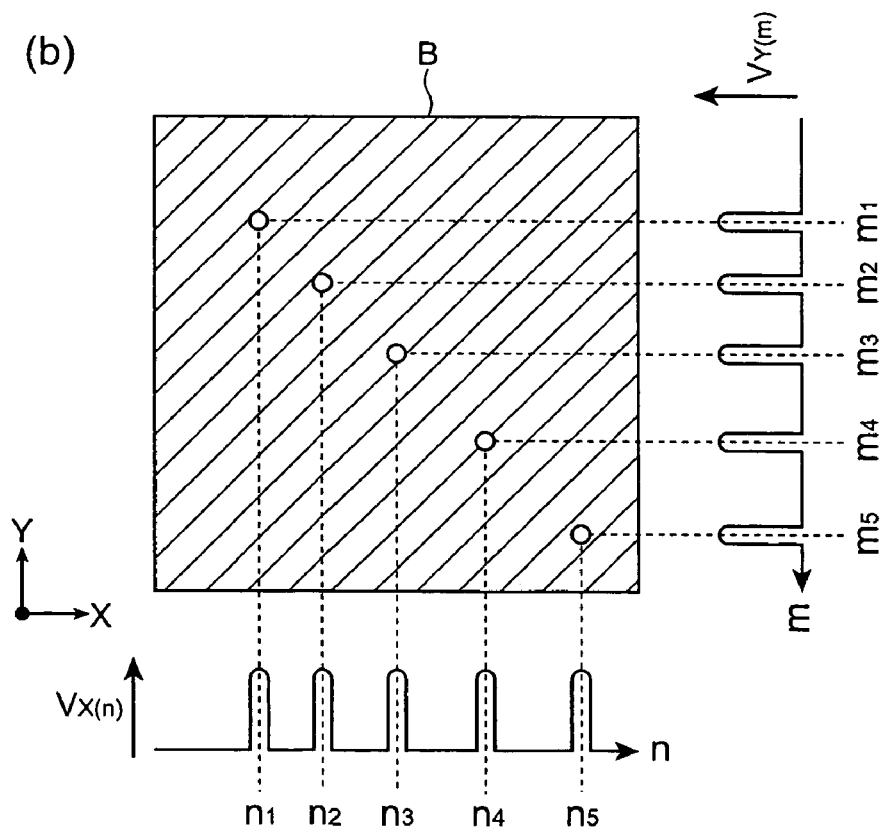

FIG. 4 shows a reference brightness image A of a first sample and a projected image B corresponding to the reference brightness image A. In detail, in the area (a) of FIG. 4, the reference brightness image A is shown, and in the area (b), the projected image B is shown together with the light intensity profile data $V_X(n)$ and $V_Y(m)$. The reference brightness image A of the first sample has a plurality of light regions (outline regions shown in the area (a)) in a dark region (hatched region shown in the area (a)). The plurality (five in this first sample) of light regions in the reference brightness image A are aligned at equal intervals on a straight line with an angle of 45 degrees with respect to both the X-direction and the Y-direction.

When the reference brightness image A of the first sample shown in the area (a) of FIG. 4 is projected onto the projected surface 3 by the projector 2, the plurality of light regions in the projected image B on the projected surface are aligned on a predetermined straight line with an angle of about 45 degrees with respect to both the X-direction and the Y-direction as shown in the area (b) of FIG. 4, however, depending on the relative arrangement relationship between the projector 2 and the projected surface 3, they may not be aligned on the predetermined straight line or are not equal intervals. Such a projected image B is formed as an image for inspection on the photosensitive surface of the photodetector 11 by the imaging optical system 12 of the photodetecting apparatus 10 and light intensity profile data $V_X(n)$ and $V_Y(m)$ in the respective X-direction and Y-direction of the image for inspection formed on the photosensitive surface are outputted from the photodetecting apparatus 10. Peak positions in the first light intensity profile data $V_X(n)$ indicate X-coordinates of the light regions in the projected image B. Peak positions in the second light intensity profile data $V_Y(m)$ indicate Y-coordinates of the light regions in the projected image B.

Then, in the analyzing apparatus 20, these light intensity profile data $V_X(n)$ and $V_Y(m)$ are analyzed based on known information concerning the reference brightness image A of the first sample to detect distortion of the projected image B projected onto the projected surface 3. Namely, when the peak positions in the first light intensity profile data $V_X(n)$ are defined as $n_1$ through $n_5$ and the peak positions in the second light intensity profile data $V_Y(m)$ are defined as $m_1$ through $m_5$ and it is assumed that the projected image B has no distortion, these satisfy the following relationships expressed by the following expressions (1a) and (1b):

$$n_5-n_4=n_4-n_3=n_3-n_2=n_2-n_1 \qquad (1a)$$

$$m_5-m_4=m_4-m_3=m_3-m_2=m_2-m_1 \qquad (1b)$$

However, if the relationships of the expressions (1a) and (1b) are not satisfied, it is judged that the projected image B has distortion. For example, as shown in the area (b) of FIG. 4, when the relationships expressed by the following expressions (2a) and (2b) are satisfied, the analyzing apparatus 20 judges that the enlargement factor is higher on the lower right side than the upper left side of the projected image B when the image is projected.

$$n_5-n_4>n_4-n_3>n_3-n_2>n_2-n_1 \qquad (2a)$$

$$m_5-m_4>m_4-m_3>m_3-m_2>m_2-m_1 \qquad (2b)$$

Figure 5:
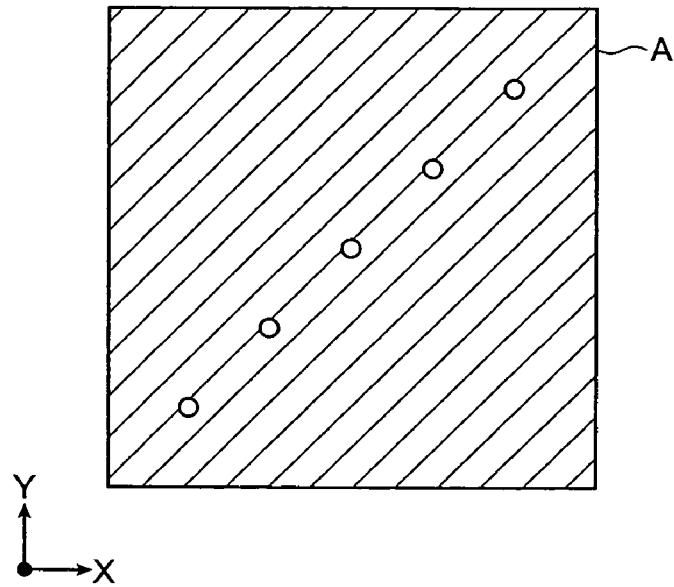
FIG. 5 is a drawing for explaining the distortion detecting method according to the present invention, showing a second sample of the reference brightness image and a projected image on a projected surface corresponding to the reference brightness image of the second sample.
Figure 5:
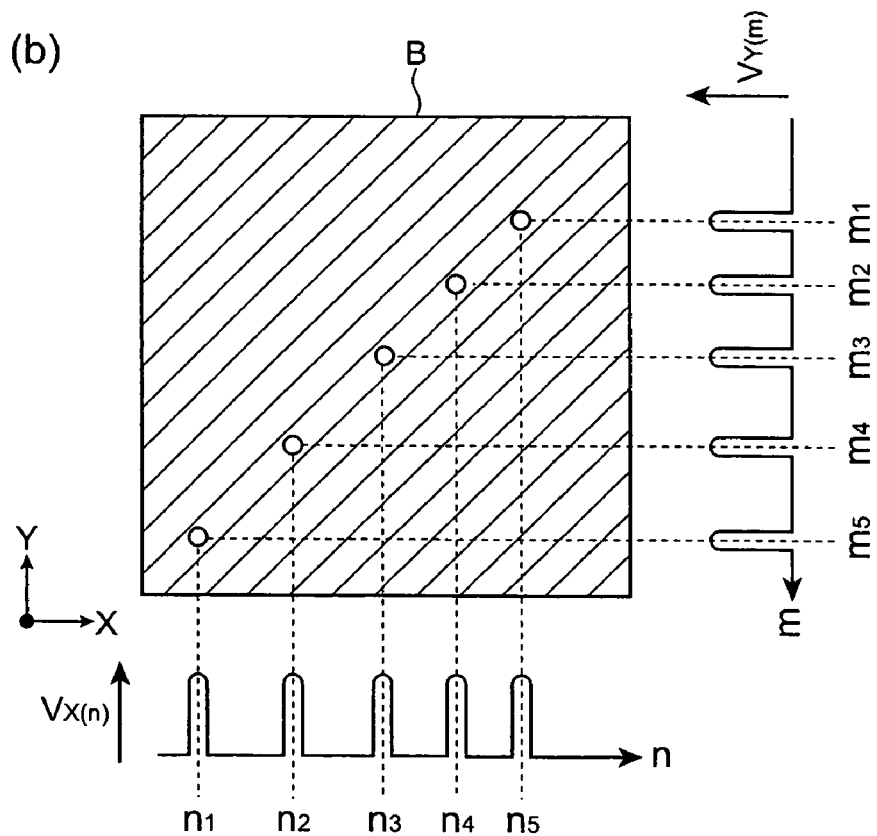

FIG. 5 shows a reference brightness image A of a second sample and a projected image B corresponding to this reference brightness image A. In detail, in the area (a) of FIG. 5, the reference brightness image A is shown, and in the area (b), the projected image B is shown together with light intensity profile data $V_X(n)$ and $V_Y(m)$. A plurality of light regions in the reference brightness image A of the second sample are aligned at equal intervals on a straight line with an angle of 45 degrees with respect to both the X-direction and Y-direction (straight line orthogonal to the straight line on which the light regions of the first sample are aligned).

When the reference brightness image A of the second sample shown in the area (a) of FIG. 5 is projected onto the projected surface 3 by the projector 2, the plurality of light regions in the projected image B on the projected surface 3 are aligned on the predetermined straight line with an angle of about 45 degrees with respect to both the X-direction and the Y-direction as shown in the area (b) of FIG. 5, however, depending on the relative arrangement relationship between the projector 2 and the projected surface 3, they are not aligned on the predetermined straight line or their intervals are not equal. Such a projected image B is formed as an image for inspection on the photosensitive surface of the photodetector 11 by the imaging optical system 12 of the photodetecting apparatus 10, and light intensity profile data $V_X(n)$ and $V_Y(m)$ in the respective X-direction and Y-direction of the image for inspection formed on the photosensitive surface are outputted from the photodetecting apparatus 10.

Then, in the analyzing apparatus 20, these light intensity profile data $V_X(n)$ and $V_Y(m)$ are analyzed based on known information concerning the reference brightness image A of the second sample to detect distortion of the projected image B projected onto the projected surface 3. When it is assumed that the projected image B has no distortion, the above-described expressions (1a) and (1b) are satisfied. However, when the relationships of the expressions (1a) and (1b) are not satisfied, it is judged that the projected image B has distortion. For example, as shown in the area (b) of FIG. 5, when the relationships expressed by the following expressions (3a) and (3b) are satisfied, the analyzing apparatus 20 judges that the enlargement factor is higher on the lower left side than the upper right side of the projected image B when the image is projected.

$$n_5-n_4<n_4-n_3<n_3-n_2<n_2-n_1 \qquad (3a)$$

$$m_5-m_4>m_4-m_3>m_3-m_2>m_2-m_1 \qquad (3b)$$

Figure 6:
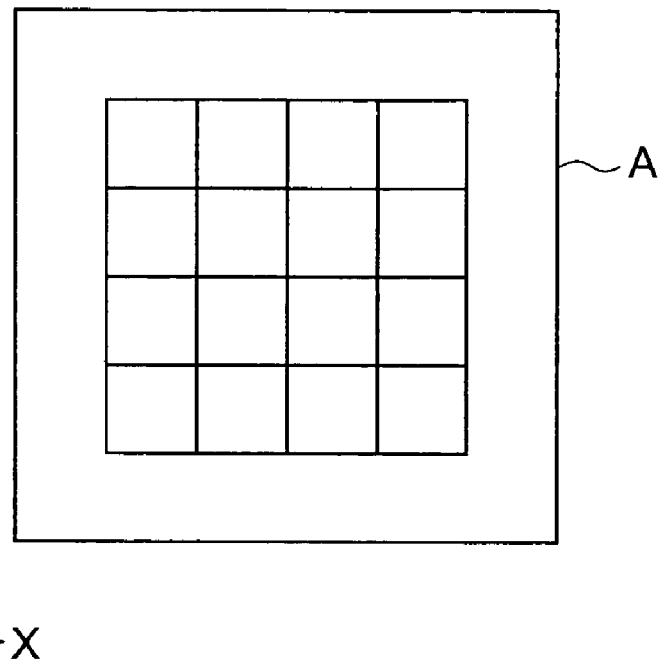
FIG. 6 is a drawing for explaining distortion of a projected image.
Figure 6:
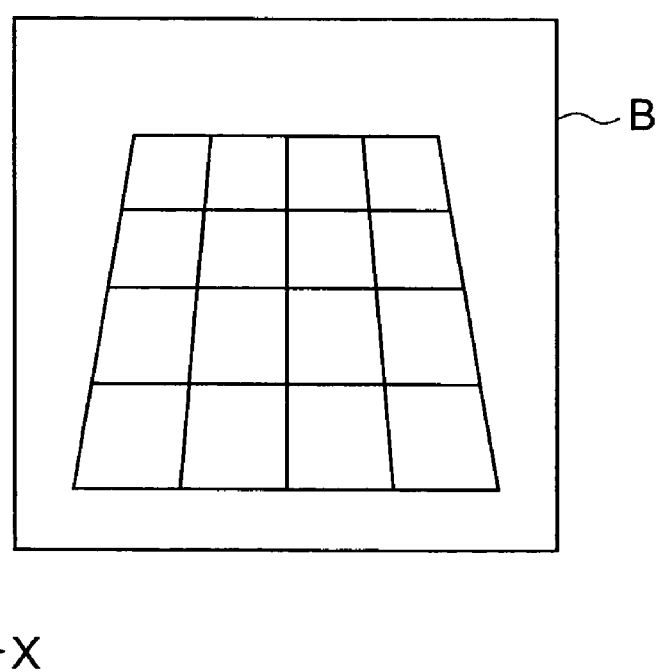

It is also allowed that the reference brightness images A of the first and second samples shown in the area (a) of FIG. 4 and the area (a) of FIG. 5 are projected in order onto the projected surface 3 by the projector 2, and light intensity profile data $V_X(n)$ and $V_Y(m)$ of the projected images B corresponding to the respective reference brightness images A of the first and second samples are acquired by the photodetecting apparatus 10 (distortion detection is performed by the analyzing apparatus 20 by using the acquired data). In this case, for example, when the projected image B corresponding to the reference brightness image A of the first sample shown in the area (a) of FIG. 4 satisfies the relationships of the expressions (2a) and (2b) and the projected image B corresponding to the reference brightness image A of the second sample shown in the area (a) of FIG. 5 satisfies the relationships of the expression (3a) and (3b), the analyzing apparatus 20 judges that the enlargement factor is higher on the lower side than the upper side of the projected image B when the image is projected. In other words, when it is assumed that an image in a pattern of meshes at equal intervals as shown in the area (a) of FIG. 6 is projected onto the projected surface 3 by the projector 2, a projected image on the projected surface 3 is distorted so that the mesh intervals become wider on the lower side than the upper side as shown in the area (b) of FIG. 6.

Figure 7:
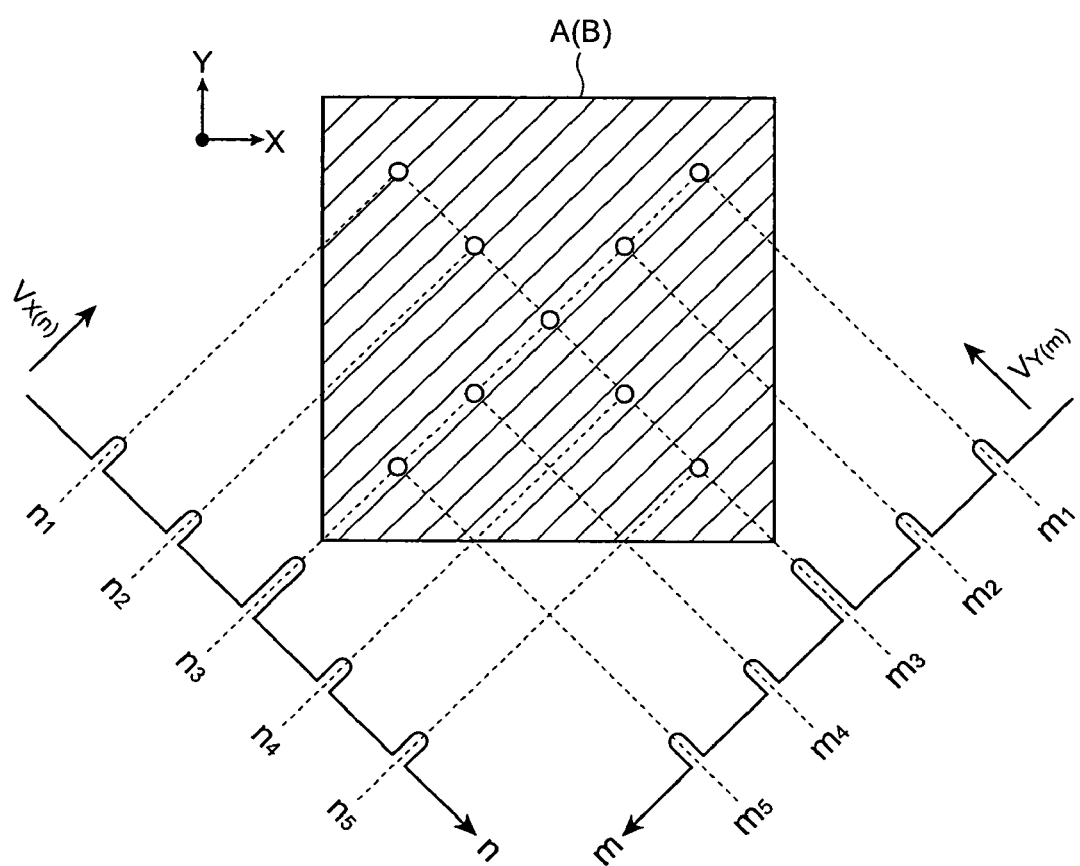
FIG. 7 is a drawing for explaining the distortion detecting method according to the present invention, showing a third sample of the reference brightness image and a projected image on a projected surface corresponding to the reference brightness image of the third sample.

FIG. 7 shows a reference brightness image A of a third sample and a projected image B on the projected surface 3 corresponding to this reference brightness image A. In detail, in FIG. 7, the reference brightness image A is shown, and the projected image B is shown together with light intensity profile data $V_X(n)$ and $V_Y(m)$. In this reference brightness image A of the third sample, a plurality of light regions are aligned at equal intervals on a straight line with an angle of 45 degrees with respect to both the X-direction and the Y-direction, and furthermore, a plurality of light regions are also aligned at equal intervals on a straight line orthogonal to said straight line. In this case, the photodetecting apparatus 10 is arranged in a state in that it is rotated only 45 degrees around the optical axis of the imaging optical system 12.

Figure 8:
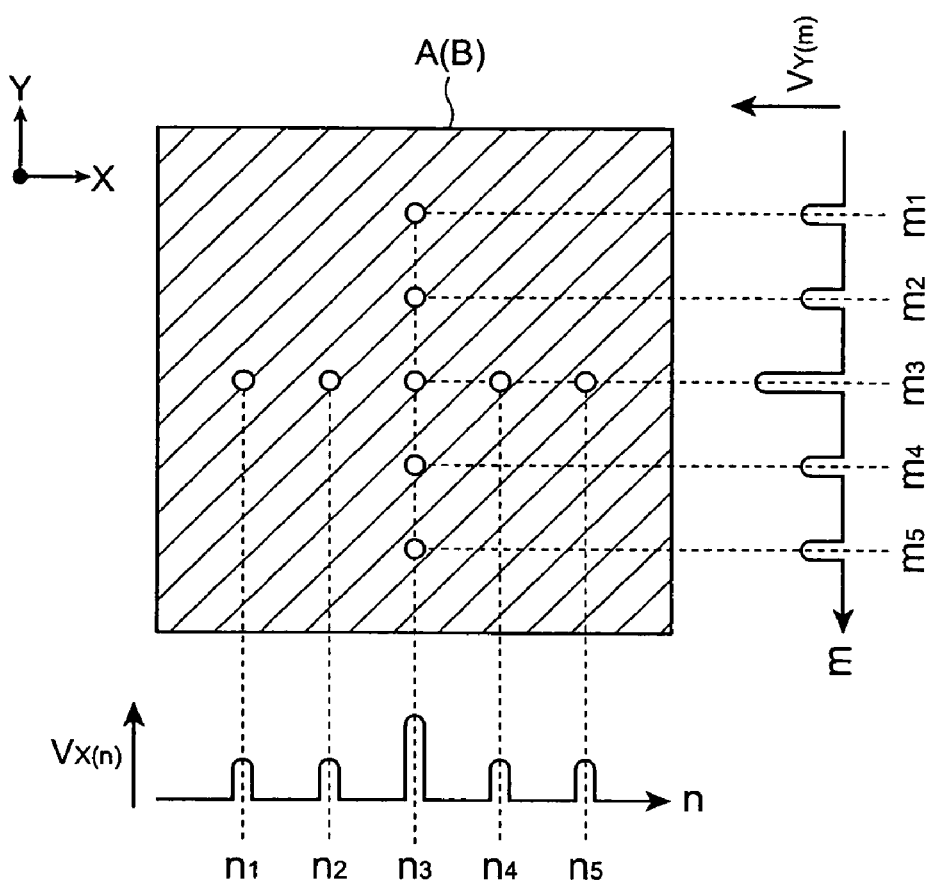
FIG. 8 is a drawing for explaining the distortion detecting method according to the present invention, showing a fourth sample of the reference brightness image and a projected image on a projected surface corresponding to the reference brightness image of the fourth sample.

FIG. 8 shows a reference brightness image A of a fourth sample and a projected image B on the projected surface 3 corresponding to this reference brightness image A. In detail, in FIG. 8, the reference brightness image A is shown, and the projected image B is shown together with light intensity profile data $V_X(n)$ and $V_Y(m)$. In this reference brightness image A of the fourth sample, a plurality of light regions are aligned at equal intervals on a straight line parallel to the X-direction, and furthermore, a plurality of light regions are also aligned at equal intervals on a straight line parallel to the Y-direction.

Figure 9:
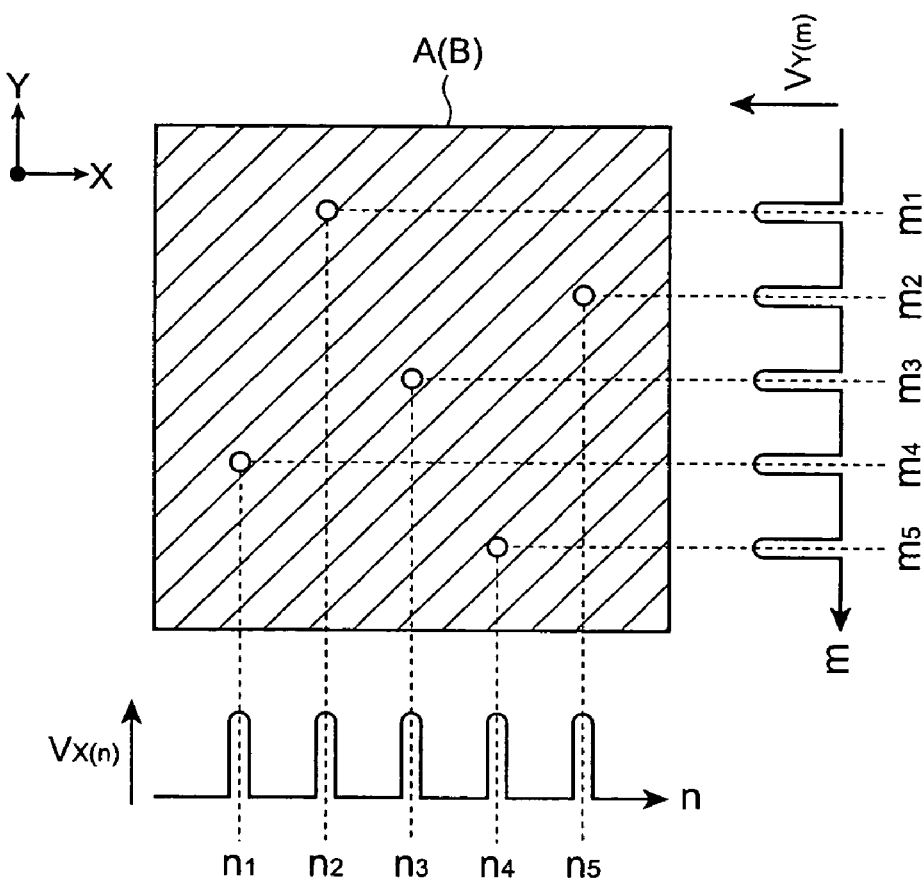
FIG. 9 is a drawing for explaining the distortion detecting method according to the present invention, showing a fifth sample of the reference brightness image and a projected image on a projected surface corresponding to the reference brightness image of the fifth sample.

Furthermore, FIG. 9 shows a reference brightness image A of a fifth sample and a projected image B on the projected surface 3 corresponding to this reference brightness image A. In detail, in FIG. 9, the reference brightness image A is shown, and the projected image B is shown together with light intensity profile data $V_X(n)$ and $V_Y(m)$. The reference brightness image A of the fifth sample does not include two of the light regions aligned on one straight line parallel to the X-direction or Y-direction among a plurality of light regions.

In all cases of the reference brightness images A of the third through fifth samples shown FIGS. 7 to 9, light intensity profile data $V_X(n)$ and $V_Y(m)$ outputted from the photodetecting apparatus 10 are analyzed by the analyzing apparatus 20 through a comparison with the reference brightness images A, and distortions of the projected images B are detected.

As described above, in the distortion detecting system 1 or distortion detecting method according to the present invention, distortion of a projected image is detected by using the photodetecting apparatus 10 which outputs light intensity profile data that indicates one-dimensional distributions of incident light intensity in the respective first and second directions. From this fact, in accordance with the present invention, positions of a plurality of light regions on the projected image can be detected and distortion of the projected image can be efficiently detected in comparison with the conventional technique to which a two-dimensional PSD is applied. Even in comparison with the conventional technique to which a CCD is applied, the data amount to be handled can be reduced and distortion of a projected image can be easily and efficiently detected.

In addition, in comparison with the case where a two-dimensional PSD is applied, the present invention can reduce the size of the peripheral circuits, and structure the device compactly at low cost. Moreover, in comparison with the case where a CCD is applied, according to the present invention, the peripheral circuits such as an image memory and an image computing unit, etc., becomes unnecessary, so that the device can be structured compactly at low cost.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The present invention is applicable to a distortion correcting system and the like of a projector such as an over-head projector which projects an image of light transmitting through a transparent sheet on which images such as characters and figures are drawn onto a projected surface, or a projector which projects an image outputted as a video signal from a computer or video equipment onto a projected surface.

The invention claimed is:

1. A distortion detecting system detecting distortion of a projected image which is projected onto a projected surface by a projector, comprising:
    a photodetecting apparatus having a photodetector which includes a plurality of pixels two-dimensionally arranged on a photosensitive surface, and an imaging optical system which forms the projected image on the photosensitive surface, said photodetecting apparatus making the imaging optical system form a projected image of a reference brightness image, that is projected onto the projected surface by said projector, onto the photosensitive surface, said photodetecting apparatus further having a first signal processing section forming and outputting a first light intensity profile data that indicates a one-dimensional distribution of incident light intensity in a first direction on the projected image, and a second signal processing section forming and outputting a second light intensity profile data that indicates a one-dimensional distribution of incident light intensity in a second direction different from the first direction on the image; and
    an analyzing apparatus detecting distortion of the projected image by analyzing both of the first light intensity profile data in the first direction and the second light intensity profile data in the second direction that are extracted from the projected image,
    wherein the reference brightness image has three or more light regions in a dark region, all of the light regions being on the same straight line and aligned intervals between the adjacent light regions become equal, and
    wherein said analyzing apparatus detects, as first result, intervals between light intensity peaks in the first light intensity profile data, detects, as a second result, intervals between light intensity peaks in the second light intensity profile data, and detects the distortion of the projected image by comparing only the first and second results detected.

2. A distortion detecting method of detecting distortion of a projected image projected onto a projected surface by a projector, comprising:
    a projecting step for making said projector project a reference brightness image onto the projected surface;
    a photodetecting step, by using a photodetecting apparatus having a photodetector which includes a plurality of pixels two-dimensionally arranged on a photosensitive surface and an imaging optical system which forms a projected image on the projected surface onto the photosensitive surface, for making said imaging optical system form a projected image, that is projected onto the projected surface in the projecting step, onto a photosensitive surface, and for separately acquiring a first light intensity profile data in a first direction on the projected image and a second light intensity profile data in a second direction different from the first direction on the projected image; and
    an analyzing step for detecting distortion of the projected image by analyzing both of the first light intensity profile data in the first direction and the second light intensity profile data in the second direction that are extracted from the projected image,
    wherein the reference brightness image has three or more light regions in a dark region, all of the light regions being on the same straight line and aligned intervals between the adjacent light regions become equal, and
    wherein, in the analyzing step, intervals between light intensity peaks in the first light intensity profile data are detected as a first result, intervals between light intensity peaks in the second light intensity profile data are detected as a second result, and the distortion of the projected image is detected by comparing only the first and second results detected.

* * * * *